United States Patent Office

2,877,232
Patented Mar. 10, 1959

2,877,232

2-(4-ISOPENTYLOXYPHENYL)-IMINO, 3(4-ISO-PENTYLOXYPHENYL)-THIAZOLIDINE AND THERAPEUTICALLY USEFUL SALTS

Charles Ferdinand Huebner, Chatham, N. J., assignor to Ciba Pharmaceutical Products, Inc., Summit, N. J., a corporation of New Jersey No Drawing. Application December 31, 1957
Serial No. 706,284

2 Claims. (Cl. 260—306.7)

The present invention relates to a new thiazolidine derivative, the 2-(4-isopentyloxy-phenyl)-imino-3-(4-isopentyloxy-phenyl)-thiazolidine and the sales thereof, as well as the process for the manufacture of such compound.

Salts of the new thiazolidine derivative of this invention are particularly useful acid addition salts, for example, those with inorganic acids, such as, hydrohalic acids, e. g. hydrochloric or hydrobromic acid; perchloric, nitric or thiocyanic acid; or sulfuric or phosphoric acids; or those with organic acids, such as, formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, 4-amino-benzoic, 4-hydroxybenzoic, anthranilic, cinnamic, mandelic, salicylic, 4-aminosalicylic, 2-phenoxybenzoic, 2-acetoxy-benzoic, methane sulfonic, ethane sulfonic, hydroxyethane sulfonic, benzene sulfonic, p-toluene sulfonic, naphthalene sulfonic or sulfanilic acid or methionine, tryptophane, lysine or arginine.

The new thiazolidine derivative and the salts thereof inhibit the growth of different types of mycobacteria, such as *Mycobacterium tuberculosis*, for example, the human pathogenic strain H 37 Rv of *Mycobacterium tuberculosis*, or *Mycobacterium leprae* and may be used as an antitubercular or antileprotic agent. The new compounds can be used as a medicament in the form of pharmaceutical preparations, which contain the new compound or a salt thereof in admixture with a pharmaceutical organic or inorganic solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be, for example, in solid form as tablets, dragées or capsules, or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

The new compound and its salts may be prepared according to procedures used for analogous compounds, for example, by reacting 1,3-bis-(4-isopentyloxy-phenyl)-2-thiourea with a reactive ester of 1,2-ethanediol, and, if desired, a resulting salt is converted into the base, and/or, if desired, the resulting base is converted into the salts thereof.

A reactive ester of 1,2-ethanediol is particularly an ester with a strong inorganic acid, such as a hydrohalic acid, e. g. hydrochloric, hydrobromic or hydriodic acid; or sulfuric acid; or with a strong organic acid such as an organic sulfonic acid, e. g. p-toluene sulfonic acid. The reaction is preferably carried out in the absence of a solvent by using an excess of the reactive ester of 1,2-ethanediol as the solvent, and is completed by heating, for example, to the boiling point of the ester. I prefer to prepare the thiazolidine of this invention by refluxing an excess of 1,2-dibromo-ethane with the 1,3-bis-(4-isopentyloxy-phenyl)-2-thiourea.

Depending on the conditions used the new compound is obtained in the form of the free base or as a salt thereof. A salt may be converted into the free base in the customary way, for example, by reaction with an alkali metal hydroxide, e. g. sodium or potassium hydroxide; or with aqueous ammonia. The free base may be transformed into its therapeutically useful acid addition salts by reaction with an appropriate inorganic or organic acid such as one of those outlined above, for example, in an alcohol, e. g. methanol or ethanol, or ether, e. g. diethyl ether, solution or a mixture of such solvents.

The following example illustrates the invention; temperatures are given in degrees centigrade.

*Example*

A mixture of 10 g. of 1,3-bis-(4-isopentyloxy-phenyl)-2-thiourea and 20 ml. of 1,2-dibromo-ethane is refluxed for 30 minutes. On addition of an excess of ether a gum precipitates, which is triturated with an ethanol solution of ammonia. The 2-(4-isopentyloxy-phenyl)-imino-3-(4-isopentyloxy-phenyl)-thiazolidine crystallizes and is recrystallized from ethanol, M. P. 107–108°.

By adding oxalic acid to a boiling ethanol solution of 2 - (4 - isopentyloxy - phenyl) - imino - 3 - (4 - isopentyloxy-phenyl)-thiazolidine the oxalate of 2-(4-isopentyloxy - phenyl) - imino - 3 - (4 - isopentyloxy - phenyl)-thiazolidine can be isolated upon addition of ether.

The thiazolidine derivative of this invention may also be prepared by introducing into the 4-position of the phenyl radicals of the 2-phenyl-imino-3-phenyl-thiazolidine molecule the isopentyloxy groups. This may be achieved, for example, by reacting the 2-(4-hydroxy-phenyl)-imino-3-(4-hydroxy-phenyl)-thiazolidine with an isopentylhalide, e. g. isopentyl chloride or bromide. The phenolic starting material may be used in the form of its alkali metal, e. g. sodium, salt which may be prepared by reacting the starting material with an alkali metal, e. g. sodium, amide or hydride in an inert solvent, e. g. benzene, toluene or dioxane. Or, the phenolic starting material may be etherified directly by reaction with the isopentylhalide in the presence of an alkali metal carbonate or alkaline earth metal carbonate, e. g. sodium carbonate, potassium hydrogen carbonate or calcium carbonate. Instead of both, only one of the isopentyloxy groups may be introduced according to the above procedure, if the second isopentyloxy group is already present.

What is claimed is:

1. A member of the group consisting of 2-(4-isopentyloxy-phenyl) - imino - 3 - (4 - isopentyloxy - phenyl) - thiazolidine and a therapeutically useful acid addition salt thereof.

2. 2 - (4 - isopentyloxy - phenyl) - imino - 3 - (4 - isopentyloxy-phenyl)-thiazolidine.

References Cited in the file of this patent

Erlenmeyer et al.: Helv. Chim. Acta, vol. 30, pages 1336–8.